US012562625B2

(12) United States Patent
Sugano et al.

(10) Patent No.: US 12,562,625 B2
(45) Date of Patent: Feb. 24, 2026

(54) ROTATING ELECTRICAL MACHINE AND METHOD FOR MANUFACTURING ROTATING ELECTRICAL MACHINE

(71) Applicant: NISSAN MOTOR CO., LTD., Yokohama (JP)

(72) Inventors: Shunta Sugano, Kanagawa (JP); Toru Nakada, Kanagawa (JP); Kohei Murota, Kanagawa (JP); Tatsuya Imai, Kanagawa (JP); Masanobu Abe, Kanagawa (JP); Masahide Kimura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 203 days.

(21) Appl. No.: 18/561,550

(22) PCT Filed: May 17, 2021

(86) PCT No.: PCT/JP2021/018690
§ 371 (c)(1),
(2) Date: Nov. 16, 2023

(87) PCT Pub. No.: WO2022/244083
PCT Pub. Date: Nov. 24, 2022

(65) Prior Publication Data
US 2024/0235334 A1      Jul. 11, 2024

(51) Int. Cl.
*H02K 11/25*          (2016.01)
*H02K 3/50*           (2006.01)
*H02K 15/12*          (2006.01)

(52) U.S. Cl.
CPC .............. *H02K 11/25* (2016.01); *H02K 3/50* (2013.01); *H02K 15/12* (2013.01); *H02K 2203/09* (2013.01)

(58) Field of Classification Search
CPC .......... H02K 11/25; H02K 11/00; H02K 3/50; H02K 15/12; H02K 2203/09; H02K 5/225; H02K 3/52
(Continued)

(56) References Cited

U.S. PATENT DOCUMENTS 12,107,460 B2 * 10/2024 Silvery ................... H02K 3/12
2012/0086292 A1    4/2012 Ishida et al.
2013/0270973 A1   10/2013 Ikemoto

FOREIGN PATENT DOCUMENTS

JP       2008-131775 A    6/2008
JP       2011-004496 A    1/2011
(Continued)

OTHER PUBLICATIONS

Ikemoto et al, Rotary Electric Machine, Oct. 24, 2013, JP 2013219913 (English Machine Translation) (Year: 2013).*

*Primary Examiner* — Alexander A Singh
(74) *Attorney, Agent, or Firm* — Foley & Lardner LLP

(57) ABSTRACT

A rotating electrical machine includes: a three-phase coil including a U-phase coil, a V-phase coil, and a W-phase coil each formed of a flat wire; a neutral point bus bar forming a neutral point of the three-phase coil and formed of a conductive plate; and a temperature detector configured to detect a temperature of the three-phase coil. The neutral point bus bar is formed in an arc shape along an outer periphery of the three-phase coil. One end of one coil in the three-phase coil is connected to a vicinity of a center of the neutral point bus bar in a circumferential direction thereof. One end of each of remaining two coils in the three-phase coil is connected to a vicinity of an end of the neutral point bus bar in the circumferential direction.

2 Claims, 3 Drawing Sheets

(58) Field of Classification Search
USPC .................................................. 310/68 C, 71
See application file for complete search history.

(56)                   References Cited

FOREIGN PATENT DOCUMENTS

| | | | |
|---|---|---|---|
| JP | 2013-219961 | A | 10/2013 |
| JP | 2013-225959 | A | 10/2013 |
| JP | 2013219913 | A * | 10/2013 |
| JP | 2016-129446 | A | 7/2016 |
| JP | 2018-121389 | A | 8/2018 |
| JP | 2019-047661 | A | 3/2019 |

* cited by examiner

ROTATING ELECTRICAL MACHINE AND METHOD FOR MANUFACTURING ROTATING ELECTRICAL MACHINE

TECHNICAL FIELD

The present invention relates to a rotating electrical machine and a method for manufacturing the rotating electrical machine.

BACKGROUND ART

JP2019-47661A discloses a rotating electrical machine including a stator winding having three-phase (U-phase, V-phase, and W-phase) windings and a stator core.

In the rotating electrical machine of JP2019-47661A, a neutral terminal of a U-phase winding and a neutral terminal of a V-phase winding are connected to each other by a connection member, a neutral terminal of a V-phase winding and a neutral terminal of a W-phase winding are connected to each other by a connection member, and a temperature sensor is provided on a connection member that connects the neutral terminal of the U-phase winding and the neutral terminal of the V-phase winding.

SUMMARY OF INVENTION

However, in the rotating electrical machine of JP2019-47661A, since the temperature sensor is provided on the connection member that connects the neutral terminal of the V-phase winding and the neutral terminal of the W-phase winding, there is a problem that, for example, when a current flows through the neutral terminal of the V-phase winding and the neutral terminal of the W-phase winding between the connection members, a temperature cannot be accurately measured.

The present invention has been made in view of such a technical problem, and an object of the present invention is to provide a rotating electrical machine capable of accurately measuring a temperature of a three-phase coil regardless of a current flowing between any coils in the three-phase coil.

According to an aspect of the present invention, a rotating electrical machine comprises: a three-phase coil including a U-phase coil, a V-phase coil, and a W-phase coil each formed of a flat wire; a neutral point bus bar forming a neutral point of the three-phase coil and formed of a conductive plate; and a temperature detector configured to detect a temperature of the three-phase coil. The neutral point bus bar is formed in an arc shape along an outer periphery of the three-phase coil. One end of one coil in the three-phase coil is connected to a vicinity of a center of the neutral point bus bar in a circumferential direction thereof, and one end of each of remaining two coils in the three-phase coil is connected to a vicinity of an end of the neutral point bus bar in the circumferential direction. The temperature detector is attached to a position facing the one end of the one coil in the vicinity of the center of the neutral point bus bar.

DESCRIPTION OF EMBODIMENTS

Hereinafter, an embodiment of the invention will be described with reference to the drawings or the like.

Figure 1:
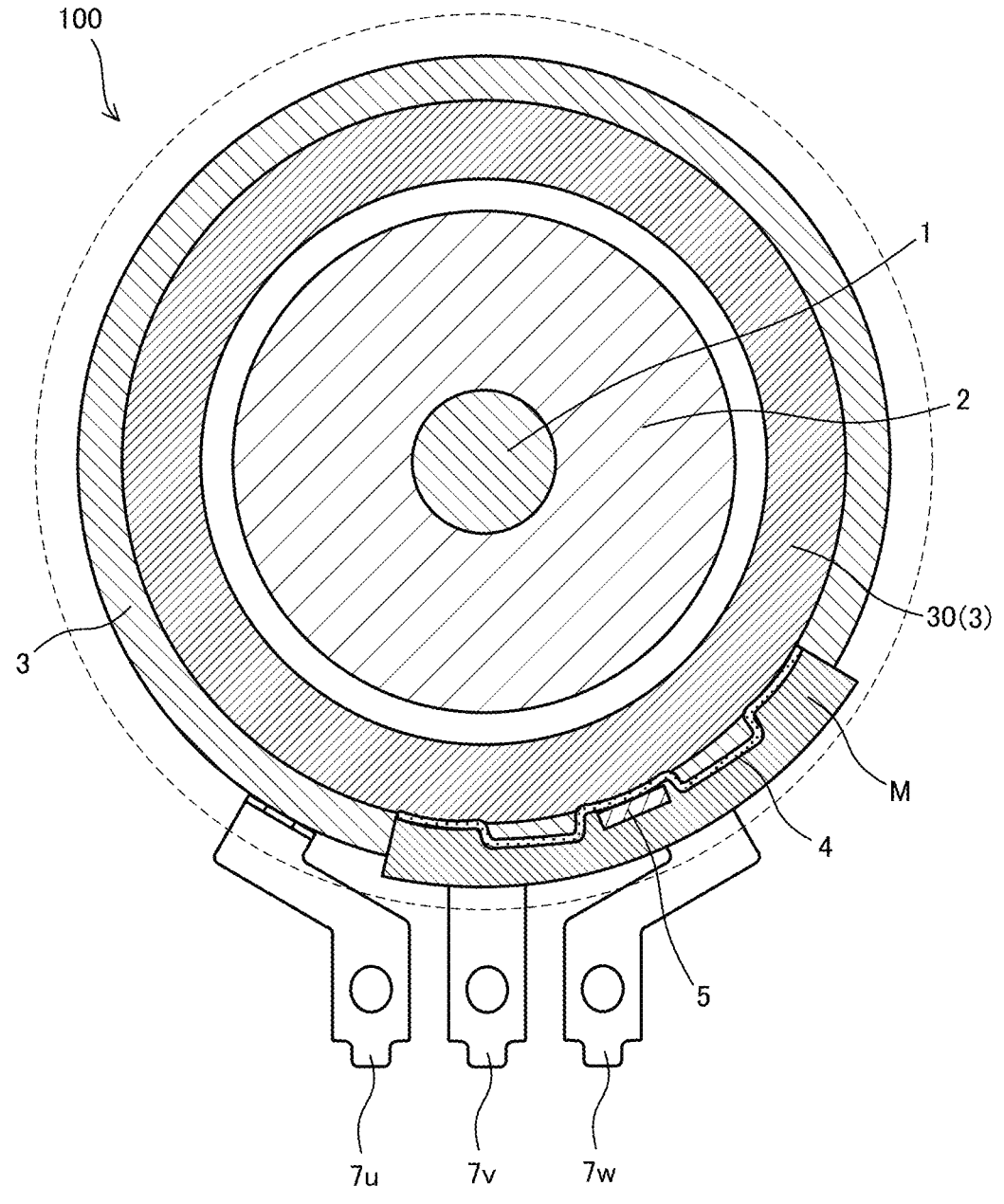
FIG. 1 is a schematic cross-sectional view in an axial direction of a motor according to an embodiment of the present invention.
Figure 2:
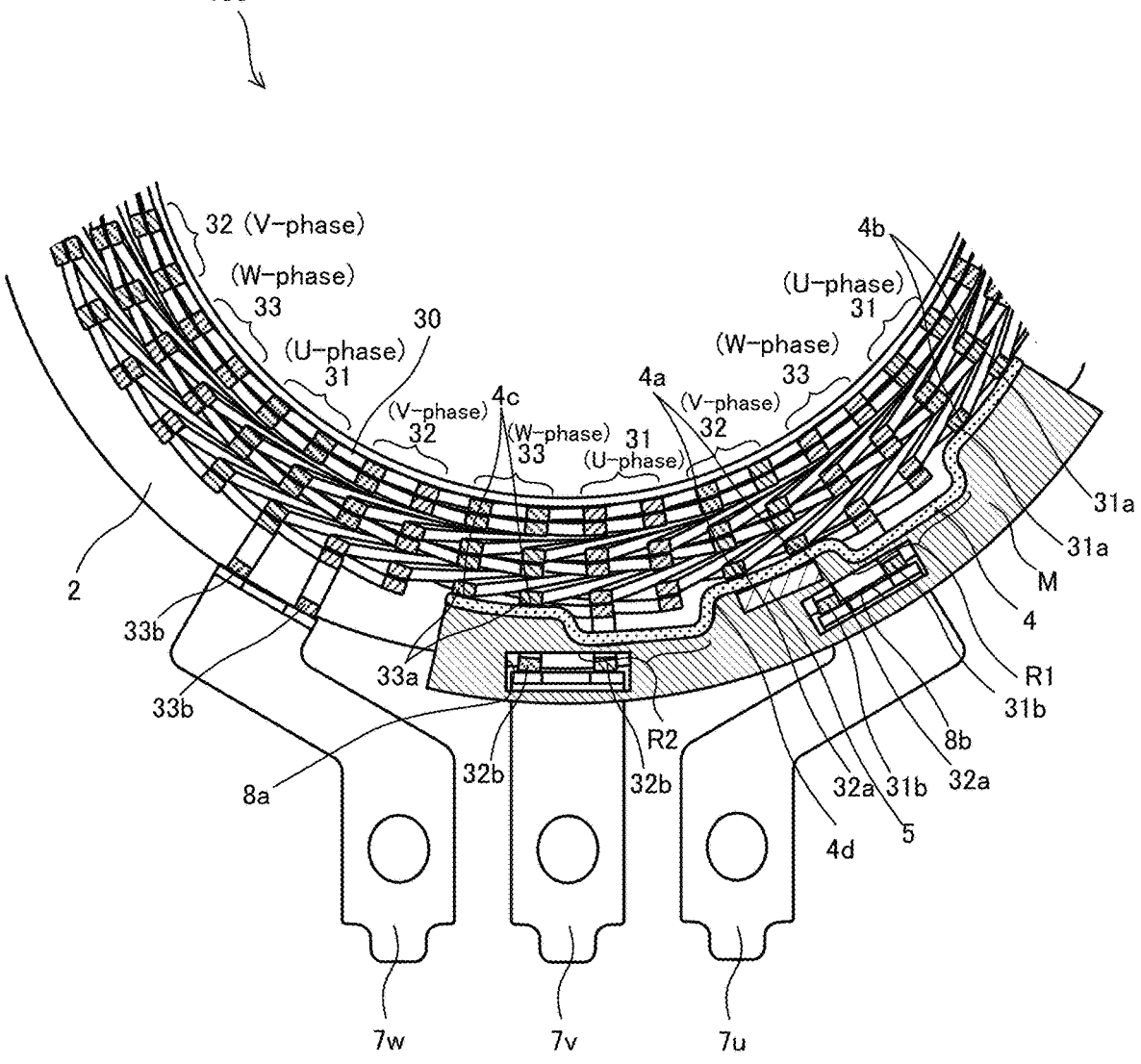
FIG. 2 is an enlarged view of a vicinity of a neutral point bus bar of the motor according to the embodiment of the present invention.

FIG. 1 is a schematic cross-sectional view in an axial direction of a motor 100 as a rotating electrical machine according to the present embodiment. FIG. 2 is an enlarged view of a vicinity of a neutral point bus bar 4 of the motor 100 according to the present embodiment.

The motor 100 is a three-phase dielectric motor mounted on a vehicle and driven by a three-phase alternating current. The motor 100 is used as, for example, a motor generator for driving a hybrid vehicle. As shown in FIG. 1, the motor 100 includes a rotating shaft 1, a rotor 2 fixed to the rotating shaft 1, a stator core 3, and a neutral point bus bar 4. The motor 100 is supplied with electrical power from an inverter unit (not shown) to rotate the rotor 2, thereby rotationally driving the rotating shaft 1.

The stator core 3 is formed in a cylindrical shape, and includes a three-phase coil 30 including a U-phase coil 31, a V-phase coil 32, and a W-phase coil 33 on a radially inner side (see FIG. 2). The three-phase coil 30 is configured by arranging the U-phase coil 31, the V-phase coil 32, and the W-phase coil 33 in this order in a circumferential direction thereof.

The U-phase coil 31, the V-phase coil 32, and the W-phase coil 33 are formed by mutually connecting a plurality of segment coils each formed in a U shape. The segment coil is constituted by a conducting wire in which a periphery of a conductor having a rectangular cross section is covered with an insulating layer, that is, a so-called flat wire. The flat wire is a metal wire with high electrical conductivity. The metal wire is formed of, for example, copper, aluminum, silver, gold, or an alloy thereof. The insulating layer is formed of, for example, a resin coating. As the resin, a polyamide-based resin, an epoxy-based resin, an acrylic-based resin, or a urethane-based resin can be used.

The neutral point bus bar 4 is formed of, for example, a conductive metal plate. As shown in FIGS. 1 and 2, the neutral point bus bar 4 is formed in an arc shape along an outer periphery of the three-phase coil 30. As shown in FIG. 2, in the present embodiment, one end 32a of the V-phase coil 32 is connected to a vicinity of a center (connection point 4a) of the neutral point bus bar 4 in the circumferential direction, and one end 31a of the U-phase coil 31 and one end 33a of the W-phase coil 33 are connected to vicinities (connection points 4b and 4c) of ends of the neutral point bus bar 4 in the circumferential direction. The other ends 31b, 32b, 33b of the U-phase coil 31, the V-phase coil 32, and the W-phase coil 33 are respectively connected to metal terminals 7u, 7v, and 7w electrically connected to an inverter unit (not shown).

The neutral point bus bar 4 is formed in a shape in which vicinities of the connection points 4a, 4b, and 4c protrude toward the center of the arc. With such a shape, it is possible to prevent a region R1 between the connection point 4a and the connection point 4b of the neutral point bus bar 4 and a region R2 between the connection point 4a and the connection point 4c from coming into contact with the three-phase coil 30, and it is possible to secure insulation between the three-phase coil 30 and the neutral point bus bar 4 in the regions R1 and R2.

As shown in FIGS. 1 and 2, the motor 100 further includes a thermistor 5 as a temperature detector that detects a temperature of the three-phase coil 30. The thermistor 5 is provided in the vicinity of the center of the neutral point bus bar 4 (in the vicinity of the connection point 4a) so as to face a position to which the one end 32a of the V-phase coil 32 is connected. In other words, the thermistor 5 is attached to a recess 4d that is recessed inward in a radial direction by protruding the vicinity of the center (the vicinity of the connection point 4a) of the neutral point bus bar 4 toward the center of the arc. In the present embodiment, the neutral point bus bar 4 and the thermistor 5 are integrated by a molding material M.

In the neutral point bus bar 4 configured as described above, even when the current flows between the U-phase coil 31 and the V-phase coil 32, between the W-phase coil 33 and the V-phase coil 32, or between the U-phase coil 31 and the W-phase coil 33, the current flows in the vicinity of the connection point 4a (recess 4d).

Therefore, by attaching the thermistor 5 to the position (recess 4d) facing the connection point 4a, it is possible to measure the temperature even when the current flows between any coils of the three three-phase coils 30.

In contrast, in a case where the thermistor 5 is attached to a place other than the vicinity of the connection point 4a (recess 4d), specifically, for example, in a case where the thermistor 5 is attached to the region R1 between the connection point 4b and the connection point 4a of the neutral point bus bar 4, the temperature when the current flows between the W-phase coil 33 and the V-phase coil 32 cannot be measured. In a case where the motor 100 is in a locked state or in a case where a rotation speed of the motor 100 is extremely low, the current flowing through the three-phase coil 30 is large, and thus the temperature of the three-phase coil 30 increases. In such a state, in a case where it is not possible to measure the temperature when the current flows between the W-phase coil 33 and the V-phase coil 32, it is not possible to execute appropriate control, and the motor 100 may be damaged.

Therefore, in the present embodiment, the thermistor 5 is attached to the above position. Accordingly, the temperature of the three-phase coil 30 can be accurately measured regardless of the current flowing between any coils of the three three-phase coils 30, and the motor 100 can be appropriately controlled.

As described above, the neutral point bus bar 4 and the thermistor 5 are integrated by the molding material M. Here, a method of integrating the neutral point bus bar 4 and the thermistor 5 will be described.

Figure 3A:
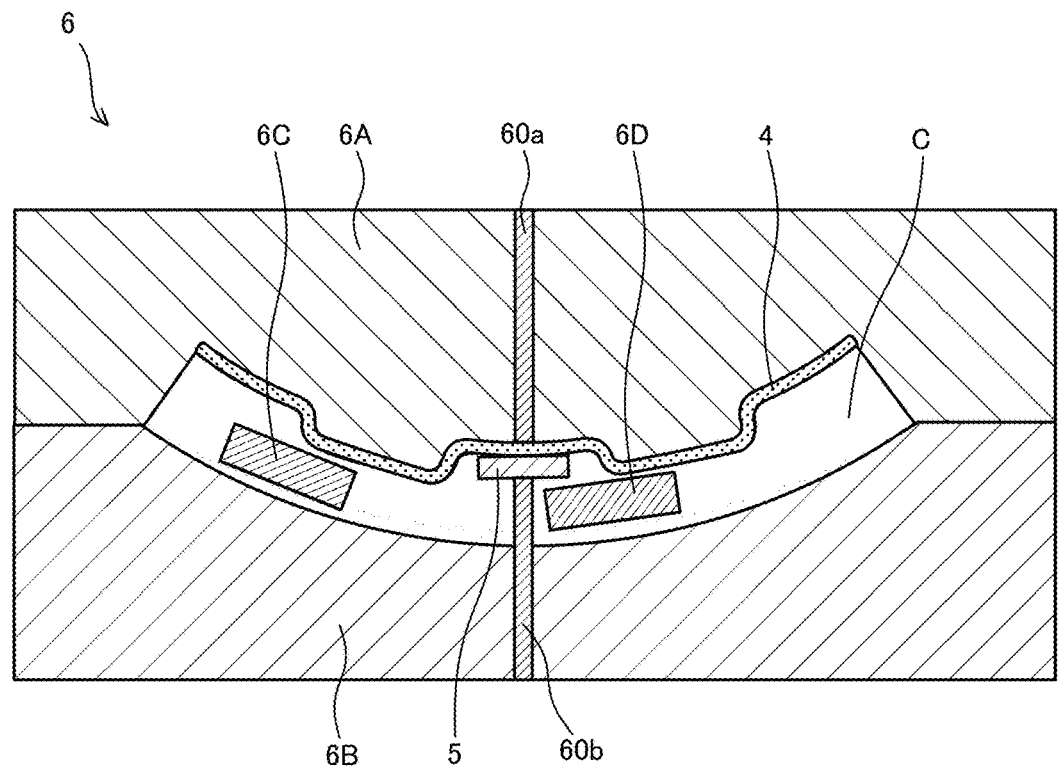
FIG. 3A is a diagram showing a state in which the neutral point bus bar and a thermistor according to the embodiment of the present invention are set in a mold.
Figure 3B:
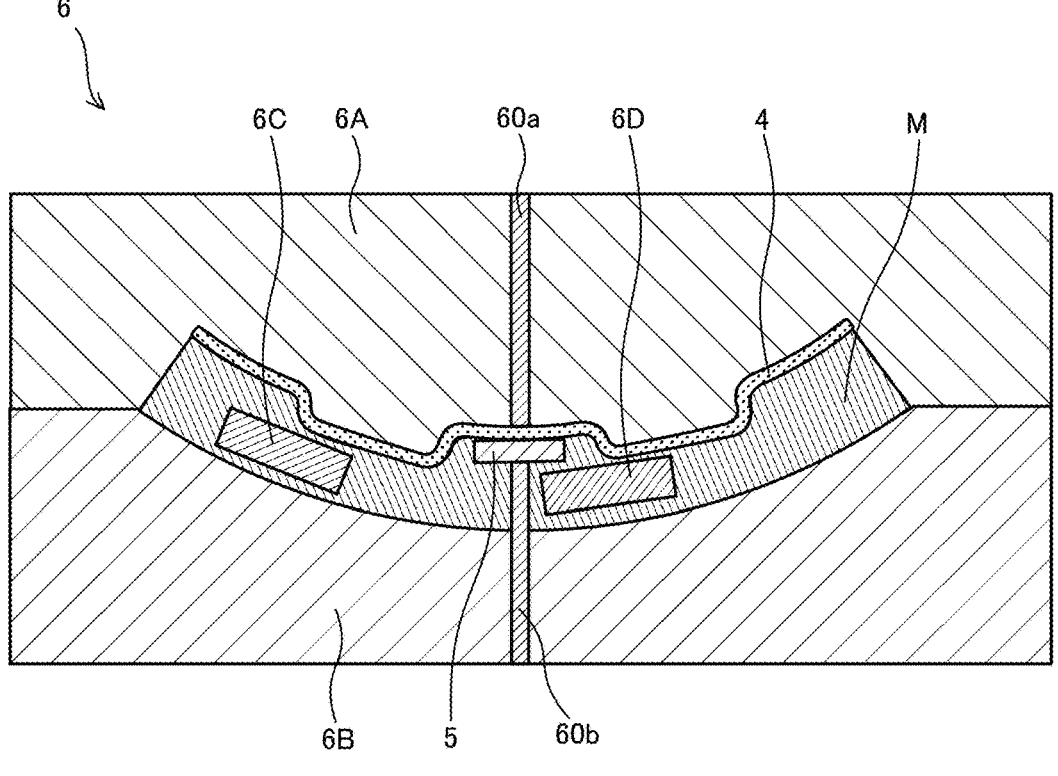
FIG. 3B is a diagram showing a state in which a molding material is injected into the mold according to the embodiment of the present invention.

In the present embodiment, the neutral point bus bar 4 and the thermistor 5 are integrated by molding. Specifically, as shown in FIG. 3A, the neutral point bus bar 4 and the thermistor 5 are set in a cavity C of a mold 6 formed by an upper mold 6A and a lower mold 6B. At this time, the neutral point bus bar 4 and the thermistor 5 are clamped by ejector pins 60a and 60b provided in the upper mold 6A and the lower mold 6B so as to maintain a state in which the neutral point bus bar 4 and the thermistor 5 are in contact with each other. Pins 6C and 6D shown in FIGS. 3A and 3B are pins for forming a through hole 8a through which a connection portion between the other end 32b of the V-phase coil 32 and the terminal 7v is inserted and a through hole 8b through which a connection portion between the other end 31b of the U-phase coil 31 and the terminal 7u is inserted, respectively.

Thereafter, by injecting the molding material M into the cavity C of the mold 6 (see FIG. 3B), the neutral point bus bar 4 and the thermistor 5 are integrated.

When the thermistor 5 is fixed to the neutral point bus bar 4 by an adhesive or the like, the adhesive is interposed between the thermistor 5 and the neutral point bus bar 4, and the temperature detection accuracy of the thermistor 5 may deteriorate.

On the other hand, in the present embodiment, the neutral point bus bar 4 and the thermistor 5 are molded while being clamped by the ejector pins 60a and 60b so as to maintain a state in which the neutral point bus bar 4 and the thermistor 5 are in contact with each other, and thus the neutral point bus bar 4 and the thermistor 5 are integrated so as to be in direct contact with each other. Accordingly, since no adhesive is interposed between the thermistor 5 and the neutral point bus bar 4, the temperature of the thermistor 5 can be accurately detected.

The configuration, action, and effect of the embodiment of the present invention configured as described above will be collectively described.

The motor 100 (rotating electrical machine) includes the three-phase coil 30 including the U-phase coil 31, the V-phase coil 32, and the W-phase coil 33 each formed of the flat wire, the neutral point bus bar 4 that forms a neutral point of the three-phase coil 30 and is formed of a conductive plate, and the thermistor 5 (temperature detector) that detects a temperature of the three-phase coil 30. The neutral point bus bar 4 is formed in an arc shape along the outer periphery of the three-phase coil 30, the one end 32a of the V-phase coil 32 in the three-phase coil 30 is connected to the vicinity of the center (connection point 4a) of the neutral point bus bar 4 in the circumferential direction, and each of the one end 31a of the U-phase coil 31 and the one end 33a of the W-phase coil 33 in the three-phase coil 30 is connected to a vicinity of an end of the neutral point bus bar 4 in the circumferential direction. The thermistor 5 (temperature detector) is attached to a position facing the one end 32a of the V-phase coil 32 near the center of the neutral point bus bar 4.

With this configuration, even when the current flows between the U-phase coil 31 and the V-phase coil 32, between the W-phase coil 33 and the V-phase coil 32, or between the U-phase coil 31 and the W-phase coil 33, the current flows in the vicinity of the center (connection point 4a) of the neutral point bus bar 4. By providing the thermistor 5 at a position facing the one end 32a of the V-phase coil 32, the temperature of the three-phase coil 30 can be measured regardless of the current flowing between any coils of the three three-phase coils 30.

In the motor 100 (rotating electrical machine), the neutral point bus bar 4 has the recess 4d recessed radially inward, and the thermistor 5 (temperature detector) is provided in the recess 4d.

With this configuration, the amount of protrusion of the thermistor 5 (temperature detector) radially outward can be reduced.

In the motor 100 (rotating electrical machine), the neutral point bus bar 4 and the thermistor 5 (temperature detector) are integrated by the molding material M.

With this configuration, since the neutral point bus bar 4 and the thermistor 5 (temperature detector) are integrated, the work of fixing the thermistor 5 (temperature detector) to the neutral point bus bar 4 with an adhesive or the like can be omitted. Accordingly, the work efficiency at the time of assembling the motor 100 (rotating electrical machine) can be improved. Since the adhesive or the like is not interposed between the thermistor 5 (temperature detector) and the neutral point bus bar 4, it is possible to prevent the temperature detection accuracy of the thermistor 5 from deteriorating.

In a method for manufacturing the motor 100 (rotating electrical machine), in the mold 6 including the upper mold 6A and the lower mold 6B, the neutral point bus bar 4 and the thermistor 5 (temperature detector) are molded while being clamped by the ejector pins 60a and 60b provided on the upper mold 6A and the lower mold 6B so as to maintain a state in which the neutral point bus bar 4 and the thermistor 5 (temperature detector) are in contact with each other. The neutral point bus bar 4 and the thermistor 5 (temperature detector) integrated by molding are attached to the three-phase coil 30.

With this configuration, the neutral point bus bar 4 and the thermistor 5 are integrated in direct contact with each other. Accordingly, since the adhesive is not interposed between the thermistor 5 and the neutral point bus bar 4, it is possible to prevent the temperature detection accuracy of the thermistor 5 from deteriorating. In addition, since it is not necessary to separately provide a support pin or the like in the mold 6 at the time of integration, it is possible to prevent an increase in cost and complication of a structure of the mold 6. Further, since the neutral point bus bar 4 and the thermistor 5 (temperature detector) are integrally attached to the three-phase coil 30, it is possible to improve work efficiency at the time of assembling the motor 100 (rotating electrical machine).

The embodiments of the present invention, the above embodiment and modification are merely a part of application examples of the present invention, but do not mean that the technical scope of the present invention is limited to the specific configuration of the above embodiment.

The motor 100 is not limited to a motor mounted on a vehicle. The configuration related to the neutral point bus bar 4 can also be applied to a generator.

In the above embodiment, the case where the one end 32a of the V-phase coil 32 is connected to the vicinity of the center (connection point 4a) of the neutral point bus bar 4 has been described as an example, but the present invention is not limited thereto. The one end 31a of the U-phase coil 31 or the one end 33a of the W-phase coil 33 may be connected to the vicinity of the center (connection point 4a) of the neutral point bus bar 4.

Although the thermistor 5 has been described as an example of the temperature detector in the above embodiment, the temperature detector is not limited thereto, and may be another type of temperature detector (thermocouple, platinum resistance thermometer, or the like).

In the above embodiment, the case where the neutral point bus bar 4 and the thermistor 5 are integrated by molding has been described as an example, but the present invention is not limited thereto. In a case where a measurement error can be allowed or corrected, the base bus bar 4 and the thermistor 5 may be integrated using an adhesive. Further, the thermistor 5 may be attached to the neutral point bus bar 4 using an attachment member or the like.

As for a shape of the neutral point bus bar 4, the regions R1 and R2 may not bulge outward in the radial direction as long as the insulation is ensured.

In the above embodiment, the case where the other ends 31b and 32b of the U-phase coil 31 and the V-phase coil 32 are surrounded by the molding material M has been described as an example, but the present invention is not limited thereto. The other end 33b of the W-phase coil 33 may also be surrounded by the molding material.

The invention claimed is:

1. A rotating electrical machine comprising:
   a three-phase coil including a U-phase coil, a V-phase coil, and a W-phase coil each formed of a flat wire;
   a neutral point bus bar forming a neutral point of the three-phase coil and formed of a conductive plate; and
   a temperature detector configured to detect a temperature of the three-phase coil, wherein:
   the neutral point bus bar and the temperature detector are integrated by a molding material,
   the neutral point bus bar is formed in an arc shape along an outer periphery of the three-phase coil,
   one end of a first coil in the three-phase coil is connected to a vicinity of a center of the neutral point bus bar in a circumferential direction thereof,
   one end of a second coil in the three-phase coil is connected to a vicinity of a first end of the neutral point bus bar in the circumferential direction,
   one end of a third coil in the three-phase coil is connected to a vicinity of a second end of the neutral point bus bar in the circumferential direction,
   the temperature detector is attached to a position facing the one end of the first coil in the vicinity of the center of the neutral point bus bar,
   the neutral point bus bar includes a recess recessed radially inward,
   the temperature detector is provided in the recess at the position facing the one end of the first coil with the neutral point bus bar sandwiched between the temperature detector and the one end of the first coil, and
   the molding material has a through-hole for inserting a terminal that connects to an other end of at least one of the three-phase coils.

2. A method for manufacturing the rotating electrical machine according to claim 1, the method comprising:
   performing molding in a mold frame including an upper mold and a lower mold by clamping the neutral point bus bar and the temperature detector with ejector pins provided in the upper mold and the lower mold so as to maintain a state in which the neutral point bus bar and the temperature detector are in contact with each other; and
   attaching the neutral point bus bar and the temperature detector integrated by the molding to the three-phase coil.

* * * * *